COHERENT FREQUENCY CONVERTER FOR TESTING MICROWAVE DEVICES WITH AUDIO SPECTRUM ANALYZER
Filed March 6, 1963
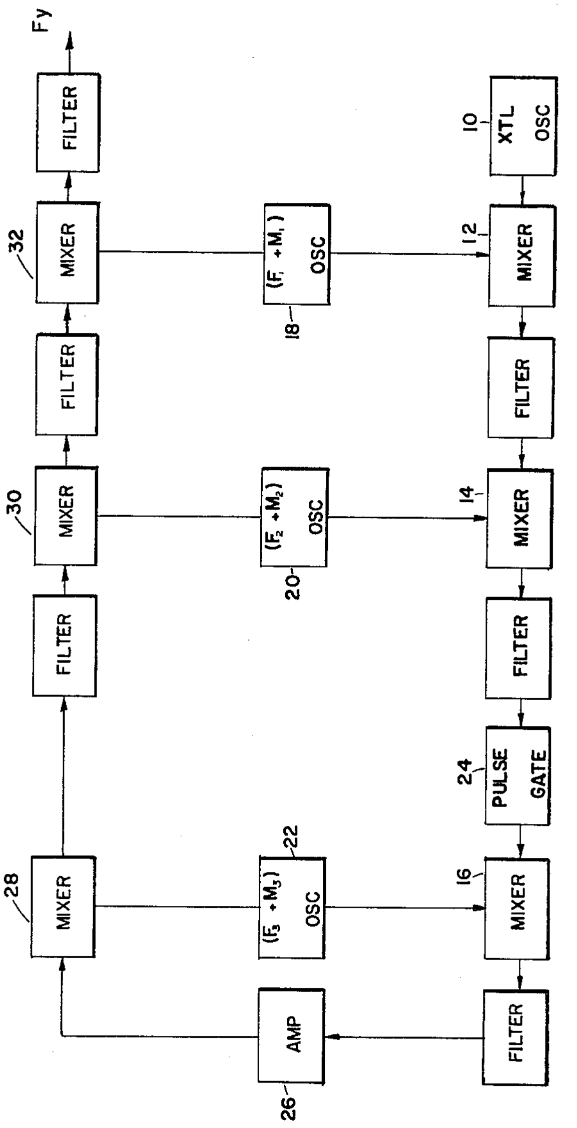
Roland F. Koontz, Jr.
*INVENTOR.*
BY Edward J. Kelly
Herbert Berl
Jack W. Voigt United States Patent Office 3,202,931
Patented Aug. 24, 1965

3,202,931

COHERENT FREQUENCY CONVERTER FOR TESTING MICROWAVE DEVICES WITH AUDIO SPECTRUM ANALYZER

Roland F. Koontz, Jr., Moorestown, N.J., assignor, by mesne assignments, to the United States of America as represented by the Secretary of the Army Filed Mar. 6, 1963, Ser. No. 263,685
1 Claim. (Cl. 331—39)

This invention relates generally to a frequency conversion system and more particularly to a coherent frequency converter for transferring microwave pulsed signals to a low frequency where they can be spectrum analyzed with a conventional audio spectrum analyzer.

In the design, construction, and evaluation of high power microwave amplifiers and their associated transmitter systems, a high degree of emphasis is currently being placed on the development of microwave amplifier systems which amplify complex microwave pulse spectra without introducing noise or spurious modulation into the spectrum. The frequency spectrum of a periodic pulsed microwave signal consists of discreet energy lines with a frequency spacing equal to the pulse repetition frequency. In many radar systems today, it is necessary to keep the energy distribution of these lines confined to a narrow frequency space with the interline frequency regions kept free of all noise and spurious modulation. To meet these requirements, equipment capable of measuring spectrum line widths and inspecting interline frequency regions is required. Commercial panoramic spectrum analyzers on the market today do not have narrow enough resolution to resolve the line structure of most microwave pulse spectrums. They are limited in their resolution by the frequency instability of their internal sweeping and transfer oscillators, and by the Q of their filters.

Using a coherent conversion system, transfer oscillator instabilities can be eliminated. A coherent converter translates a very stable low frequency signal up to microwave frequency in several conversions using separate transfer oscillators. This microwave signal is used as the input signal to a device under test. The output spectrum of the device under test is reconverted to the low frequency using the same transfer oscillators as for the up conversion. This operation cancels any transfer oscillator instability from the spectrum output at the low frequency.

It is, therefore, an object of this invention to provide a frequency converted signal free from transfer oscillator instabilities.

Another object of this invention is to provide a signal source for high frequency amplifiers.

It is a further object of this invention to provide a device for converting a signal from a low frequency to a high frequency and back to a low frequency.

Other objects and advantages of this invention will become more fully apparent from the following detailed description and from the accompanying drawings wherein the single figure is a block diagram illustrating one preferred form of the present invention.

Referring now to the drawings in detail, the conversion of a signal from a low frequency crystal oscillator to a high frequency is accomplished by mixers 12, 14 and 16 and transfer oscillators 18, 20, and 22. The output of mixer 14 is gated by gate circuit 24 to form a pulse spectrum. The output of mixer 16 is connected to a device 26 which may be any microwave amplifier.

The down conversion is obtained by mixers 28, 30 and 32 connected to transfer oscillators 22, 20 and 18 respectively. In use the output of mixer 32 would be fed to a low frequency spectrum analyzer.

In operation of the system the output $F_0$ of crystal oscillator 10 is mixed up to a microwave frequency $F_X$ in three mixing operations.

(1) $$F_X = F_0 + [F_1 + M_1] + [F_2 + M_2] + [F_3 + M_3]$$

(2) $$F_X = [F_0 + F_1 + F_2 + F_3] + [M_1 + M_2 + M_3]$$

The sum $[F_0+F_1+F_2+F_3]$ is the microwave frequency desired. The sum $[M_1+M_2+M_3]$ is the combined amplitude and frequency instabilities of the three transfer oscillators. This combination signal $F_X$ is passed through device 26 which is under test. The device under test adds modulation components $M_X$ to the signal $F_X$. This signal $F_X+M_X$ is then reconverted to $F_Y$ in three mixing operations, as follows:

(3) $$[F_X + M_X] - [F_1 + M_1 + F_2 + M_2 + F_3 + M_3] = F_Y$$

Substituting for $F_X$ yields (4) $$[F_0 + (F_1 + F_2 + F_3) + (M_1 + M_2 + M_3) + M_X] - [(F_1 + F_2 + F_3) + (M_1 + M_2 + M_3)] = F_Y$$

(5) $$F_0 + M_X = F_Y$$

The output signal $F_Y$ consists of the modulation $M_X$ occurring in the microwave device under test on a base frequency $F_0$. The instabilities ($M_1$, $M_2$, $M_3$) of the local oscillators 18, 20 and 22 have been cancelled in the coherent mixing process. The base frequency $F_0$ on which the modulation $M_X$ is now carried is low enough to permit fine spectrum analysis with conventional low frequency spectrum analyzers.

While the invention has been described with reference to a preferred embodiment thereof, it will be apparent that various modifications and other embodiments thereof will occur to those skilled in the art within the scope of the invention. Accordingly I desire the scope of my invention to be limited only by the appended claim.

I claim:

A coherent frequency conversion system for use with an audio spectrum analyzer comprising a low frequency oscillator, a first mixer connected to the output of said oscillator, a first transfer oscillator connected to said mixer for converting the output signal of said low frequency oscillator to a high frequency signal relative to said low frequency signal, a gate circuit connected to said mixer for pulsing said high frequency signal, a second mixer connected to the output of said gate circuit, a second transfer oscillator connected to said second mixer for converting said pulsed high frequency signal to a microwave frequency signal, a microwave device connected to said second mixer, a third mixer connected to the output of said microwave device and to said second transfer oscillator, and a fourth mixer connected to said third mixer and said first transfer oscillator, whereby said microwave signal is reconverted to said low frequency.

References Cited by the Examiner

FOREIGN PATENTS 719,780 12/54 Great Britain.

ROY LAKE, *Primary Examiner.*

JOHN KOMINSKI, *Examiner.*